(12) United States Patent
Yin

(10) Patent No.: US 11,876,336 B2
(45) Date of Patent: Jan. 16, 2024

(54) POSITIVE HIGH-VOLTAGE LASER HAVING SUPER-LONG DISCHARGE TUBE

(71) Applicant: CHENGDU WEESON TECH CO., LTD., Chengdu (CN)

(72) Inventor: Weiyuan Yin, Chengdu (CN)

(73) Assignee: Chengdu Weeson Tech Co., Ltd., Chengdu (CN)

( * ) Notice: Subject to any disclaimer, the term of this patent is extended or adjusted under 35 U.S.C. 154(b) by 0 days.

(21) Appl. No.: 18/256,871

(22) PCT Filed: Aug. 29, 2022

(86) PCT No.: PCT/CN2022/115390
§ 371 (c)(1),
(2) Date: Jun. 9, 2023

(87) PCT Pub. No.: WO2023/284893
PCT Pub. Date: Jan. 19, 2023

(65) Prior Publication Data
US 2023/0402806 A1 Dec. 14, 2023

(30) Foreign Application Priority Data
Jul. 15, 2021 (CN) .......................... 202121609972.2

(51) Int. Cl.
*H01S 3/038* (2006.01)
*H01S 3/041* (2006.01)
(Continued)

(52) U.S. Cl.
CPC .......... *H01S 3/0382* (2013.01); *H01S 3/0381* (2013.01); *H01S 3/041* (2013.01); *H01S 3/0407* (2013.01); *H01S 3/2232* (2013.01)

(58) Field of Classification Search
CPC ...... H01S 3/0407; H01S 3/041; H01S 3/2232; H01S 3/0281; H01S 3/0404; H01S 3/0382

See application file for complete search history.

(56) References Cited

U.S. PATENT DOCUMENTS 3,427,564 A * 2/1969 Okaya ..................... H01S 3/036
372/63

FOREIGN PATENT DOCUMENTS

CN 2060264 U 8/1990
CN 203218693 U * 9/2013
(Continued)

OTHER PUBLICATIONS

International Search Report; International Patent Application No. PCT/CN2022/115390; dated Nov. 2, 2022; China National Intellectual Property Administration (ISA/CN), Beijing, China.

*Primary Examiner* — Joshua King
(74) *Attorney, Agent, or Firm* — Andrew D. Fortney; Central California IP Group, P.C.

(57) ABSTRACT

A positive high-voltage laser having a super-long discharge tube, including a gas storage tube having two ends respectively provided with a reflecting mirror and a light emitting surface; a water cooling tube in the gas storage tube; and a discharge tube inside the water cooling tube having two ends, each provided with an electrode. A liquid circulation space is between the discharge tube and the water cooling tube, and the water cooling tube extends outside the gas storage tube by water inlet and outlet tubes. A cathode is in a cathode chamber at the end of the discharge tube closest to the light emitting surface; a spiral gas return tube communicates with the cathode chamber; an anode circumscribes the outside of the water cooling tube at the other end (Continued)

of the discharge tube. The positive high-voltage laser can increase power with a limited length.

17 Claims, 2 Drawing Sheets

(51) Int. Cl.
*H01S 3/04* (2006.01)
*H01S 3/223* (2006.01)

(56) References Cited

FOREIGN PATENT DOCUMENTS

| | | | | | |
|---|---|---|---|---|---|
| CN | 104242023 | A | * | 12/2014 | ............... H01S 3/03 |
| CN | 204012173 | U | | 12/2014 | |
| CN | 204012173 | U | * | 12/2014 | |
| CN | 204668710 | U | * | 9/2015 | |
| CN | 105514769 | A | * | 4/2016 | |
| CN | 205406946 | U | | 7/2016 | |
| CN | 205622036 | U | * | 10/2016 | |
| CN | 107039875 | A | * | 8/2017 | ............... H01S 3/02 |
| CN | 107528196 | A | * | 12/2017 | |
| CN | 209150477 | U | * | 7/2019 | |
| CN | 209516296 | U | | 10/2019 | |
| CN | 209516296 | U | * | 10/2019 | |
| CN | 209516300 | U | | 10/2019 | |
| CN | 209516300 | U | * | 10/2019 | |
| CN | 211088733 | U | | 7/2020 | |
| CN | 111934172 | A | | 11/2020 | |
| CN | 113422279 | A | | 9/2021 | |
| CN | 113381273 | A | | 10/2021 | |
| DE | 3842993 | A1 | * | 7/1990 | |
| FR | 2575339 | A2 | | 6/1986 | |
| KR | 20110120083 | A | * | 11/2011 | |
| WO | WO-9418727 | A1 | * | 8/1994 | ............. H01S 3/036 |
| WO | WO-2015192268 | A1 | * | 12/2015 | ............. H01S 3/034 |
| WO | WO-2015192269 | A1 | * | 12/2015 | ............... H01S 3/03 |

* cited by examiner

POSITIVE HIGH-VOLTAGE LASER HAVING SUPER-LONG DISCHARGE TUBE

TECHNICAL FIELD

The utility model relates to the structural improvement of a carbon dioxide laser, and more specifically, to a small positive high-voltage laser having a super-long discharge tube with a higher power via structural improvement.

BACKGROUND

A small sealing-isolation-type carbon dioxide laser in the prior art usually consists of a gas storage tube, a discharge tube, a water cooling tube, electrodes, and a resonant cavity mirror. Cavities in which electrodes are located, i.e., an anode chamber and a cathode chamber, are provided at the two ends of the discharge tube. The typical sealed-isolation-type carbon dioxide laser has a gas return tube with a spiral structure connected to the anode chamber.

Similar structures are disclosed in China utility model patent No. 89215596.5, China utility model patent No. 201420436154.0, and China utility model patent No. 201922497384.3. To increase an output power, this structure of the sealed-isolation-type carbon dioxide laser tube usually adopts a method for increasing the length of the discharge tube, which not only increase the total length of the discharge tube but also increase the costs of the production, transportation, installation, and use of the laser.

To solve this problem, Chinese invention patent application No. CN111934172A discloses a slatted carbon dioxide glass tube laser, including a core discharge cavity. The core discharge cavity is covered by an inner glass tube and an outer glass tube in turn. The two ends of the inner glass tube are provided with a positive discharge electrode and a negative discharge electrode. The two ends of the inner glass tube near the positive discharge electrode and the negative discharge electrode are provided with a gas return disk and a fixing circular disk. Without increasing the length, a discharge volume is increased. A working gas pressure is high. A higher saturation light intensity is obtained. The structure of the carbon dioxide laser is more different from that of traditional carbon dioxide laser, and requires a larger adjustment to a production process.

SUMMARY

Regarding to the deficiencies in the prior art, an objective of the utility model is to provide a positive high-voltage laser having a super-long discharge tuber, of which the structure is similar to that of the conventional sealing-isolation-type carbon dioxide laser, and which can increase output power without increasing the overall length of the laser.

To achieve the above objective of the invention, the utility model provides the following technical solutions:

A positive high-voltage laser having a super-long discharge tube includes:
 a gas storage tube, having first and second ends respectively comprising a reflecting mirror and a light emitting surface;
 a water cooling tube in the gas storage tube; and
 a discharge tube inside the water cooling tube, having third and fourth ends respectively comprising a first electrode and a second electrode. the electrodes are connected to an exterior of the gas storage tube by lead wires, wherein:
 the discharge tube and the water cooling tube have a space therebetween configured to circulate a liquid,
 the water cooling tube is connected to the exterior of the gas storage tube by a water inlet tube and a water outlet tube,
 the first and second electrodes include a cathode in a cathode chamber at one of the third and fourth ends (of the discharge tube) closest to the light emitting surface.

The positive high-voltage laser further comprises a spiral gas return tube configured to communicate with the cathode chamber, and an anode circumscribing an outside of the water cooling tube at the other of the third and fourth ends (of the discharge tube).

The super-long discharge tube in this disclosure means that the length of the discharge tube can be longer than the discharge tube in the carbon dioxide laser in the prior art, without increasing the overall length of the gas storage tube, as well making full use of the length of the gas storage tube.

Because the anode circumscribes or surrounds the outside of the water cooling tube, it no longer occupies an interior (or the length) of the tube, and the above technical solution enables the discharge tube to be longer without increasing the size of the laser, i.e., increasing the power of the laser. Specifically, the differences between the utility model and the carbon dioxide laser in the prior art are explained.

In the carbon dioxide laser in the prior art, the gas return tube of the laser is connected to an anode side. Therefore, a corresponding anode chamber is required to connect the gas return tube to the side wall of the anode chamber. Due to characteristics of the cathode, the cathode is configured in the cathode chamber inside the tube, maintains a certain length along the axial direction of the discharge tube, and maintains a certain distance from the end of the gas storage tube.

Compared with the carbon dioxide laser in the prior art, for the technology of the utility model, the gas return tube is moved to the side of the cathode. The length of the cathode chamber is utilized. The anode is externally sleeved on the outside of the water cooling tube at the other end, thereby replacing an original anode chamber. This can fully extend the length of the discharge tube so that a conductive tube at the anode end is closer to the end of the gas storage tube, effectively utilizing the length of the gas storage tube. This allows for the longer length of the discharge tube without increasing the overall length of the laser.

Some of the preferred technical solutions of the utility model are as follows:

Preferably, the storage tube has a reduced diameter of a tube section at both ends. The end of the discharge tube at the anode end is extended into the reduced diameter of the tube section.

Preferably, the anode is configured to connect the positive high-voltage end of a power supply.

Preferably, the end of the cathode chamber is connected to the inner wall of the gas storage tube. A tube section in which the anode is located may be directly connected to an inside of the gas storage tube.

Preferably, a port of the discharge tube of the anode end is distanced from the reflecting mirror by 5 mm to 20 mm.

Compared with the prior art, the utility model has the following beneficial effects: the cathode chamber is utilized fully. The length of the anode chamber at the other end is dispensed, thus allowing for the longer length of the discharge tube and increasing the power of the laser without increasing the external dimension of the laser. In some embodiments, the entire length of the original anode chamber is used as the length of the discharge tube because there is no the anode chamber. The discharge tube can be extended to the end of the gas storage tube, and the length of the discharge tube can also be further increased due to the elimination of the anode chamber, which reduces the diameter of the section of the discharge tube.

The names of reference numbers are as follows: 01—gas storage tube, 102—guide or lead wire, 103—light emitting surface, 104—cathode, 1041—cathode chamber, 105—water outlet pipe, 106—gas return pipe, 1061—pipeline, 107—discharge tube, 108—water cooling tube, 109—anode, 110—guide or lead wire, 111—reflecting mirror.

DETAILED DESCRIPTION

The following is combined with test examples and specific embodiments of the utility model for further detailed description. However, it should not be understood that the scope of the above subject matter of the utility model is limited to the following embodiments. Any technology implemented based on the content of the utility model falls into the scope of the utility model.

Figure 1:
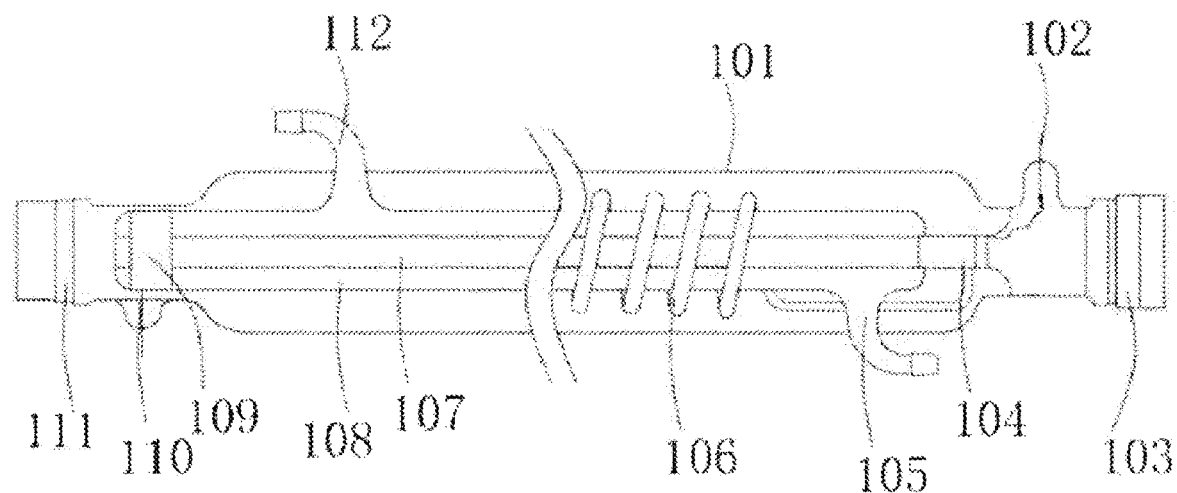
FIG. 1 is a schematic diagram of Embodiment 1 of the utility model.

A positive high-voltage laser having a super-long positive high-voltage discharge tube is disclosed. As shown in FIG. 1, the laser includes a gas storage tube 101. Usually, the gas storage tube 101 is made of glass. The two ends of the gas storage tube are configured with a reflecting mirror 111 and a light emitting surface 103, respectively. A water cooling tube 108 is inside the gas storage tube 101. A discharge tube 107 is inside a water cooling tube 108. A gap between the outer wall of the discharge tube 107 and the inner wall of the water cooling tube 108 constitutes a flow space of cooling water. As shown in FIG. 1, the water cooling tube 108 is connected to the outside of the gas storage tube 101 via a water inlet pipe 112 and a water outlet pipe 105. In this embodiment, the water cooling tube 108 and the discharge tube 107 are both made of glass. The water cooling tube 108 has a length and a diameter that are compatible with those of the discharge tube. The above structure is similar to the laser in the prior art, and can also be adjusted by a person skilled in the art based on the requirements of the specific parameters of the laser.

Figure 2:
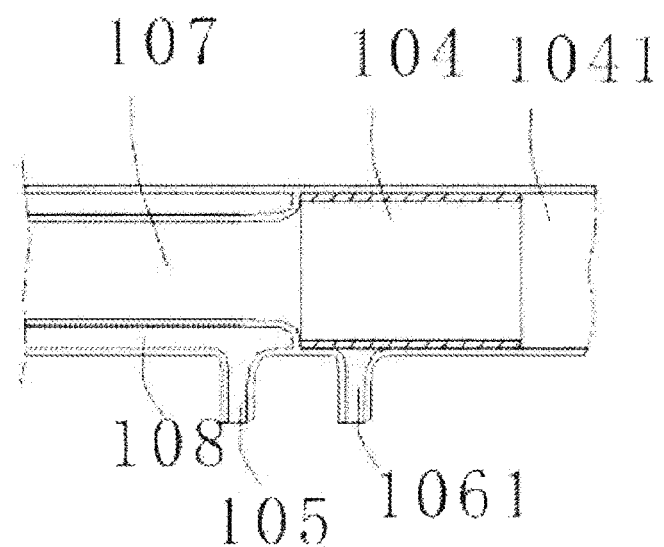
FIG. 2 is a partially enlarged diagram of a cathode chamber of an embodiment in the utility model.
Figure 3:
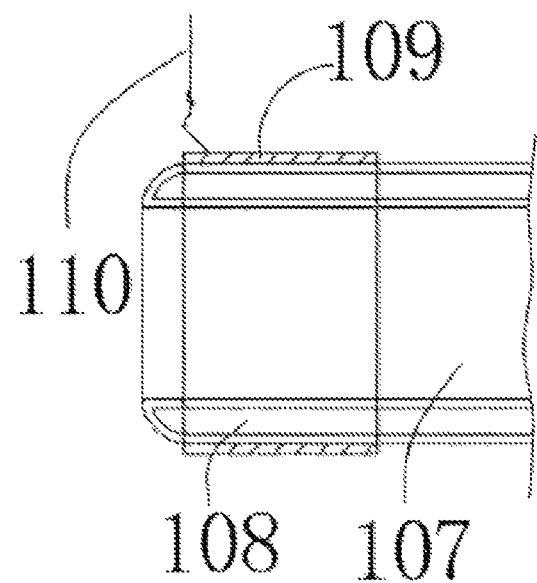
FIG. 3 is a partially enlarged sectional diagram of an anode portion of an embodiment of the utility model.

In this embodiment, as shown in FIG. 2, a cathode chamber 1041 is configured at the end of the discharge tube 107 near the end of the light emitting surface 103. The cathode chamber 1041 has a diameter slightly larger than that of the discharge tube 107. The end of the cathode chamber 1041 is connected to the inner wall of the gas storage tube 101. A pipeline 1061 communicated to a spiral gas return tube 106 is configured on the side wall of the cathode chamber 1041. The pipeline is staggered from the water outlet tube 105. The gas in the discharge tube 107 enters the gas storage tube 101 via the cathode chamber 1041 and the gas return tube 106. A cathode 104 is configured in the cathode chamber 1041. The cathode 104 is connected to the ground outside the gas storage tube 101 via a guide or lead wire 102. The end of the discharge tube 107 near the reflecting mirror 111 is configured with an anode 109. As shown in FIG. 3, the anode 109 is sleeved on the outside of the wall of the discharge tube 107 near the end of the reflecting mirror. The anode 109 is connected to the high voltage end of a power supply outside the gas storage tube 101 via the guide wire 110.

After the above laser is energized, the gas mixture in the discharge tube 107 is excited due to the impact of electrons, and in turn undergoes an energy level transition to form a particle beam, which inversely emits a laser beam. Generally speaking, the discharge tube 107 has a length directly proportional to the output power, i.e. the distance between two electrodes. Within a certain length range, the power output per meter of the length of the discharge tube increases with the total length of the discharge tube. An objective of adding the water cooling tube 108 is to cool a working gas so that the output power is stable. The two ends of the discharge tube 107 are connected to the gas storage tube 101, that is, one end of the gas storage tube 101 has a small hole communicated to the discharge tube 107, and the other end of the gas storage tube is connected to the discharge tube via the spiral gas return tube 106, so that the gas can be placed in the discharge tube 107 and circulates and flows in the gas storage tube 101. The gas in the discharge tube 107 is exchanged at any time. Because a certain space (an access space for the gas return tube) is required at the connection of the gas return tube 106 and electrode chambers 1041, the connection requires the electrode chambers and a certain length. If the gas return tube is configured at one side of the positive high-voltage anode, a certain length of the electrode chambers (an anode chamber and the cathode chamber) are required on the both sides of the positive high-voltage anode, so that the length of the discharge tube (the length between the two electrodes) is limited, i.e., the power of the laser is limited to be further increased.

In this embodiment, because the gas return tube 106 is configured on the cathode side of the cathode chamber, the anode 109 side can no longer have a corresponding anode chamber. The discharge tube 107 can be increased accordingly, which also increases the power of the laser.

As shown in FIG. 1, regarding one preferred solution of this embodiment, as the anode chamber is removed from the anode, the gas return tube is also no longer connected to the anode, resulting in a smaller radial dimension of the anode section, i.e., the section can be extended into a gradually decreasing diameter of a tapering section of the gas storage tube, so that the length of the gas storage tube is fully utilized in a certain length of the gas storage tube. The length of the discharge tube is extended, i.e., the power of the laser is increased. In a partially preferred embodiment, the port of the discharge tube at an anode end is a distance between 5 mm and 20 mm, inclusive (e.g., 5 mm or 8 mm), from the reflecting mirror. Such a configuration utilizes fully the length of the gas storage tube and increases the power of the laser without increasing the overall external length of the laser.

What is claimed:
1. A positive high-voltage laser, comprising:
a gas storage tube, having a first end comprising a reflecting mirror and a second end comprising a light emitting surface;
a water cooling tube in the gas storage tube; and
a discharge tube inside the water cooling tube, having a third end comprising a first electrode and a fourth end comprising a second electrode, the first and second electrodes being connected to an exterior of the gas storage tube by lead wires; wherein
the discharge tube and the water cooling tube have a space therebetween configured to circulate a liquid, the water cooling tube is connected to the exterior of the gas storage tube by a water inlet tube and a water outlet tube, the first and second electrodes include a cathode in a cathode chamber at one of the third and fourth ends closest to the light emitting surface, wherein the cathode chamber has an end connected to an inner wall of the gas storage tube; and the positive high-voltage laser further comprises a spiral gas return tube configured to communicate with the cathode chamber, and an anode circumscribing an outside of the water cooling tube at the other of the third and fourth ends, wherein the anode is in a tube section directly connected to an inside of the gas storage tube.

2. The positive high-voltage laser according to claim 1, wherein the first and second ends have a reduced diameter, and the other of the third and fourth ends extends into the second end.

3. The positive high-voltage laser according to claim 1, wherein the anode is configured to be connected to a positive high-voltage end of a power supply.

4. The positive high-voltage laser according to claim 1, wherein the discharge tube has a port at the fourth end distanced from the reflecting mirror by 5 mm to 20 mm.

5. The positive high-voltage laser according to claim 3, further comprising a guide wire that connects the anode to the positive high-voltage end of the power supply.

6. The positive high-voltage laser according to claim 2, wherein the anode is configured to be connected to a positive high-voltage end of a power supply.

7. The positive high-voltage laser according to claim 6, further comprising a guide wire that connects the anode to the positive high-voltage end of the power supply.

8. The positive high-voltage laser according to claim 1, further comprising a lead wire connecting the cathode to a ground potential outside the gas storage tube.

9. A positive high-voltage laser, comprising:
a gas storage tube, having a first end comprising a reflecting mirror and a second end comprising a light emitting surface;
a water cooling tube in the gas storage tube; and
a discharge tube inside the water cooling tube, having a third end comprising a first electrode and a fourth end comprising a second electrode, the first and second electrodes being connected to an exterior of the gas storage tube by lead wires, and the discharge tube having a port at the fourth end distanced from the reflecting mirror by 5 mm to 20 mm; wherein:
the discharge tube and the water cooling tube have a space therebetween configured to circulate a liquid,
the water cooling tube is connected to the exterior of the gas storage tube by a water inlet tube and a water outlet tube, the first and second electrodes include a cathode in a cathode chamber at one of the third and fourth ends closest to the light emitting surface; and
the positive high-voltage laser further comprises a spiral gas return tube configured to communicate with the cathode chamber, and an anode circumscribing an outside of the water cooling tube at the other of the third and fourth ends.

10. The positive high-voltage laser according to claim 9, wherein the first and second ends have a reduced diameter, and the other of the third and fourth ends extends into the second end.

11. The positive high-voltage laser according to claim 10, wherein the anode is configured to be connected to a high-voltage end of a power supply.

12. The positive high-voltage laser according to claim 11, further comprising a guide wire that connects the anode to the high-voltage end of the power supply.

13. The positive high-voltage laser according to claim 9, wherein the anode is configured to be connected to a high-voltage end of a power supply.

14. The positive high-voltage laser according to claim 13, further comprising a guide wire that connects the anode to the positive high-voltage end of the power supply.

15. The positive high-voltage laser according to claim 9, wherein the cathode chamber has an end connected to an inner wall of the gas storage tube.

16. The positive high-voltage laser according to claim 9, wherein the anode is in a tube section directly connected to an inside of the gas storage tube.

17. The positive high-voltage laser according to claim 9, further comprising a lead wire connecting the cathode to a ground potential outside the gas storage tube.

\* \* \* \* \*